United States Patent
Cho et al.

(10) Patent No.: US 7,266,055 B2
(45) Date of Patent: Sep. 4, 2007

(54) OPTICAL PICKUP ACTUATOR AND OPTICAL DISK DRIVE USING THE SAME AND METHOD

(75) Inventors: Won-ik Cho, Seoul (KR); Byung-ryul Ryoo, Suwon-si (KR); Young-pil Park, Seoul (KR); No-cheol Park, Seoul (KR)

(73) Assignee: Samsung Electronics Co., Ltd., Suwon-Si (KR)

( * ) Notice: Subject to any disclaimer, the term of this patent is extended or adjusted under 35 U.S.C. 154(b) by 498 days.

(21) Appl. No.: 10/849,190

(22) Filed: May 20, 2004

(65) Prior Publication Data

US 2004/0240335 A1 Dec. 2, 2004

(30) Foreign Application Priority Data

Jun. 2, 2003 (KR) ...................... 10-2003-0035305

(51) Int. Cl.
*G11B 7/00* (2006.01)

(52) U.S. Cl. .................................................. 369/44.14

(58) Field of Classification Search ............. 369/44.14, 369/44.15, 44.11, 44.16, 44.2, 44.21
See application file for complete search history.

(56) References Cited

U.S. PATENT DOCUMENTS

2002/0006090 A1  1/2002  Kawano

FOREIGN PATENT DOCUMENTS

| CN | 1335613 | 2/2002 |
| JP | 2002-140828 | 5/2002 |
| KR | 2000-39836 | 7/2000 |

OTHER PUBLICATIONS

Office Action issued by the Korean Patent Office on Feb. 24, 2005 (including English translation).
Chinese Office Action for corresponding Chinese Patent Application No.: 2004100684337 dated Mar. 30, 2007.

*Primary Examiner*—Nabil Hindi
(74) *Attorney, Agent, or Firm*—Staas & Halsey LLP

(57) ABSTRACT

An optical pickup actuator and optical disc drive using the same. The optical pickup actuator includes a blade holding an objective lens and supported on a base by a plurality of suspension wires so that it is elastically movable, a magnetic element positioned on the base, and a coil positioned horizontally on the blade to generate electromagnetic force in a focusing direction and/or a tilting direction through interaction with the magnetic element. The coil is divided into a plurality of subcoils separated vertically from one another.

45 Claims, 7 Drawing Sheets

OPTICAL PICKUP ACTUATOR AND OPTICAL DISK DRIVE USING THE SAME AND METHOD

CROSS-REFERENCE TO RELATED APPLICATION

This application claims the benefit of Korean Patent Application No. 2003-35305, filed on Jun. 2, 2003, in the Korean Intellectual Property Office, the disclosure of which is incorporated herein by reference.

BACKGROUND OF THE INVENTION

1. Field of the Invention

The present invention relates to an optical disk drive, and more particularly, to an optical disk drive including an optical pickup actuator employing a Lorenz force generated in a coil by electromagnetic induction.

2. Description of the Related Art

In general, an optical disk drive writes information by scanning light onto a disc that is a recording medium or reads information from the disc. The optical disk drive includes a spindle motor that rotates a disc and an optical pickup that records information on, or reproduces information from, a recording surface of the disc by emitting light onto the recording surface.

Typically, an optical pickup has an actuator for controlling the position of an objective lens in a focus and a tracking direction so that light is focused on a desired track formed onto a recording surface of the disc. The optical pickup actuator serves as a controller by constantly adjusting the distance between the objective lens and the recording surface so that the focus of a light spot is maintained and the light spot follows the desired track.

FIG. 1 is a perspective view of a conventional optical pickup actuator, and FIG. 2 is a top view of the optical pickup actuator of FIG. 1. Referring to FIG. 1, a blade 3 on which an objective lens 4 is mounted is positioned on a base 1 in such a way as to be elastically movable by wires 6. First coils 11a and 11b and second coils 12a and 12b are positioned on the blade 3. While the first coils 11a and 11b are wound in a vertical direction and positioned in a Y-direction symmetrically with respect to the objective lens 4, the second coils 12a and 12b are wound in a horizontal direction and positioned in an X-direction symmetrically with respect to the objective lens 4.

Magnets 21a, 21b, 22a, and 22b are also mounted on the base 1. While the magnets 21a and 21b are disposed opposite the first coils 11a and 11b, respectively, the magnets 22a and 22b are disposed opposite the second coils 12a and 12b, respectively.

In FIG. 1, X, Z, and T directions represent tracking, focusing, and tilt directions, respectively.

A description of an operation of actuating the blade 3 in a tracking direction X follows. As shown in FIG. 2, when current is supplied to the first coils 11a and 11b, an electromagnetic force Fx is induced in the first coils 11a and 11b by an interaction with the magnets 21a and 21b. If current is applied to the first coils 11a and 11b in an opposite direction to the direction marked in FIG. 2, then an electromagnetic force −Fx is induced in the first coils 11a and 11b. By controlling the direction that current is applied to the first coils 11a and 11b, the driving of blade 3 in a tracking direction X is controlled.

A description of the operation of actuating the blade 3 in a focusing direction Z follows. If current is supplied to the second coils 12a and 12b in the directions A1 and A3, respectively, an electromagnetic force Fz acting in upward +Z direction is induced in the second coils 12a and 12b by interaction with the magnets 22a and 22b. If current is applied to the second coils 12a and 12b in the directions A2 and A4, respectively, an electromagnetic force −Fz acting in downward −Z direction is induced in the second coils 12a and 12b. By supplying the current to the second coils 12a and 12b in directions A1-A3 or A2-A4, the blade 3 is driven in a focusing direction Z.

A precisely focused light spot is created only when light exiting through the objective lens 4 is incident perpendicularly to the recording surface on the disc. Otherwise, it is not possible to create a precise light spot on the disc, which may cause an error in recording data on, or reproducing data from, the disc.

Adjusting an incident angle of light so that the light is perpendicular to the recording surface of a disc is referred to as tilt or skew adjustment. Since an ability to dynamically adjust tilt is required for precise recording or reproduction, an optical pickup actuator also requires an ability to adjust in a tilt direction.

The operation of driving the blade 3 in a tilt direction T in the conventional optical pickup actuator of FIG. 1 is as follows. Actuation in the tilt direction T is performed by inducing electromagnetic forces in the second coils 12a and 12b in opposite directions. That is, if current is supplied to the second coils 12a and 12b in directions A1 and A4, respectively, then an electromagnetic force Fz acting upward is induced in the second coil 12a while an electromagnetic force −Fz acting downward is induced in the second coil 12b. Furthermore, where current is applied to the second coils 12a and 12b in directions A2 and A3, respectively, electromagnetic forces −Fz and Fz acting in upward and downward directions are induced in the second coils 12a and 12b, respectively. By supplying current to the second coils 12a and 12b in directions A1-A4 or A2-A3 in this manner, the blade 3 is driven in the tilt direction T.

The wires 6 not only elastically support the blade 3 on the base 1 but also serve as a path for supplying current to the first coils 11a and 11b and the second coils 12a and 12b. FIG. 1 shows four wires 6, and hinges 7, connecting with the wires 6, formed on the blade 3. The four wires 6, in two pairs, supply current to the first coils 11a and 11b and second coils 12a and 12b. This configuration is designed for actuation only in the focusing and tracking directions Z and X. To enable actuation in the tilt direction T, in addition to the above, current needs to be supplied separately to the second coils 12a and 12b in different directions. Thus, although not shown in the drawings, a further pair of wires are needed. Likewise, in a case where a third coil (not shown) is positioned on the blade 3 for actuation in the tilt direction T, an additional pair of wires are required.

Since the center of gravity of the blade 3 supported by the wires 6 needs to be considered, the placement of the hinge 7 is critical. As shown in FIG. 1, the four wires 6, sufficient only for actuation in focusing and tracking directions Z and X are coupled with two hinges that are formed on either an upper or a lower surface of the blade 3. However, if further actuation is required in the tilt direction T, two additional wires are needed. With the conventional optical pickup actuator of FIG. 1, coupling two additional hinges with the two wires is difficult since the first and second coils 11a, 11b, 12a, and 12b are positioned around the four sides of the blade 3.

In the conventional optical pickup actuator as described above, the magnets 21a, 21b, 22a, and 22b are positioned in four directions around the blade 3. In particular, the magnets 22a and 22b, for actuation in the focusing and tilt directions Z and T, are positioned in the tracking direction X, i.e., in a radial direction of the disc (not shown) in the optical disk drive having an optical pickup actuator. This poses a limitation in that the optical pickup actuator needs to be designed to avoid interference with a spindle motor (not shown) for rotating the disc. A recent increase in demand for super-slim disk drives requires further miniaturization and lightweight structure, i.e., by reducing the number of parts of an optical pickup actuator. Furthermore, an increase in the optical recording density requires improvement in sensitivity of actuation in tracking and tilt directions X and T.

SUMMARY OF THE INVENTION

According to an aspect of the present invention, an optical pickup actuator having a miniaturized and lightweight structure through an arrangement of coils and magnets, and optical disk drive using the same are provided.

According to an aspect of the present invention, an optical pickup actuator having improved sensitivity of actuation in focusing, tracking, and tilt directions by improving a shape of an inner yoke inserted in a coil, and optical disk drive using the same are provided.

According to an aspect of the present invention, an optical pickup actuator decreases a space limitation for installation of wires that elastically support a blade on a base, and an optical disk drive using the same are provided. Furthermore, according to an aspect of the present invention, an optical pickup actuator includes a stopper for preventing a blade from colliding with a base.

According to an aspect of the present invention, an optical pickup actuator is provided including a blade holding an objective lens and supported on a base by a plurality of suspension wires so that the blade is elastically movable, a magnetic element positioned on the base, and a coil positioned horizontally on the blade to generate electromagnetic force in a focusing and/or tilting direction through interaction with the magnetic element, where the coil is divided into a plurality of subcoils that are vertically separated from one another.

According to another aspect of the present invention, an optical disc drive including a spindle motor for rotating a disc that is a recording medium, an optical pickup for recording and/or reproducing information by emitting light onto the disc through an objective lens, and an optical pickup actuator for controlling the position of the objective lens so that light is emitted on a desired position of the disc are provided. The optical pickup actuator includes a blade holding an objective lens and supported on a base by a plurality of suspension wires so that the blade is elastically movable, a magnetic element positioned on the base, and a coil positioned horizontally on the blade to generate an electromagnetic force in a focusing direction and/or a tilting direction through interaction with the magnetic element, where the coil is divided into a plurality of subcoils that are vertically separated from one another.

According to an aspect of the invention, the coil includes a pair of first coils placed on the blade in a first direction to face each other with respect to the objective lens.

According to an aspect of the invention, the coil includes a third coil positioned on the blade to surround an outer surface of the blade.

According to an aspect of the invention, the optical pickup actuator further includes a second coil positioned vertically on either one or two sides of the blade in a second direction perpendicular to the first direction, the second coil generating an electromagnetic force in a tracking direction through interaction with the magnetic element.

According to an aspect of the invention, the optical pickup actuator further includes an inner yoke positioned on the base and inside the first coil, wherein the inner yoke has a pair of first walls disposed opposite the second coil and separated from each other in the second direction.

According to an aspect of the invention, the optical pickup actuator further includes a plurality of stoppers (e.g., three stoppers) interposed between the blade and the base for preventing the blade from colliding with the base when excessively driven toward the base and arranged in a shape (e.g., triangular shape) centered on the objective lens.

According to another aspect of the present invention, an optical pickup actuator is provided including a blade holding the objective lens and supported on a base by a plurality of suspension wires so that the blade is elastically movable, the optical pickup actuator further includes a pair of first coils positioned horizontally on the blade and disposed opposite each other with respect to the objective lens in first direction, a second coil positioned vertically on either one or two sides of the blade in a second direction perpendicular to the first direction, and an inner yoke positioned on the base, the inner yoke positioned inside a cavity defined by walls of each of the first coils, wherein the inner yoke has a pair of first walls disposed opposite the second coil and separated from each other in the second direction.

According to another aspect of the present invention, an optical disc drive is provided including a spindle motor for rotating a disc that is a recording medium, an optical pickup for recording and reproducing information by emitting light onto the disc through an objective lens, and an optical pickup actuator for controlling a position of the objective lens so that light is emitted on a desired position of the disc, where the optical pickup actuator includes a blade holding the objective lens that is supported on a base by a plurality of suspension wires so that the blade is elastically movable, a pair of first coils positioned horizontally on the blade and disposed opposite each other with respect to the objective lens in first direction, a second coil positioned vertically on either one or two sides of the blade in second direction perpendicular to the first direction, and an inner yoke positioned on the base, the inner yoke being placed inside each of the first coils, and wherein the inner yoke has a pair of first walls disposed opposite the second coil and separated from each other in the second direction.

According to an aspect of the invention, each of the first coils is divided into a plurality of subcoils that are vertically separated from one another.

According to an aspect of the invention, the optical pickup actuator further includes a third coil positioned to surround the sides of the blade.

According to an aspect of the invention, the third coil is divided into a plurality of subcoils that are vertically separated from one another.

According to an aspect of the invention, the optical pickup actuator further includes a pair of magnets disposed opposite each other with respect to the blade in the second direction, where the magnets are unipolar and magnetized to have the same polarity.

According to an aspect of the invention, the optical pickup actuator further includes three stoppers interposed between the blade and the base for preventing the blade from colliding with the base when excessively driven toward the base and arranged, in a shape (e.g., a triangular shape) centered on the objective lens.

According to another aspect of the present invention, an optical pickup actuator includes a blade holding an objective lens supported on a base by a plurality of suspension wires so that the blade is elastically movable, and a plurality of stoppers (e.g., three stoppers) interposed between the blade and the base for preventing the blade from colliding with the base when excessively driven toward the base and arranged in a triangular shape centered on the objective lens.

According to another aspect of the present invention, an optical disc drive is provided including a spindle motor for rotating a disc that is a recording medium, an optical pickup for recording and/or reproducing information by emitting light onto the disc through an objective lens, and an optical pickup actuator controlling the position of the objective lens so that light is emitted on a desired position of the disc, where the optical pickup actuator includes a blade holding the objective lens and supported on a base by a plurality of suspension wires so that the blade is elastically movable, and a plurality of stoppers (e.g., three stoppers) interposed between the blade and the base for preventing the blade from colliding with the base when excessively driven toward the base and arranged in a shape (e.g., a triangular shape) centered on the objective lens. The stoppers are positioned in various locations, for example, either on the blade or the base.

Additional aspects and/or advantages of the invention will be set forth in part in the description which follows and, in part, will be obvious from the description, or may be learned by practice of the invention.

BRIEF DESCRIPTION OF THE DRAWINGS

These and/or other aspects and advantages of the invention will become apparent and more readily appreciated from the following description of the embodiments taken in conjunction with the accompanying drawings in which.

DETAILED DESCRIPTION OF THE EMBODIMENTS

Figure 1:
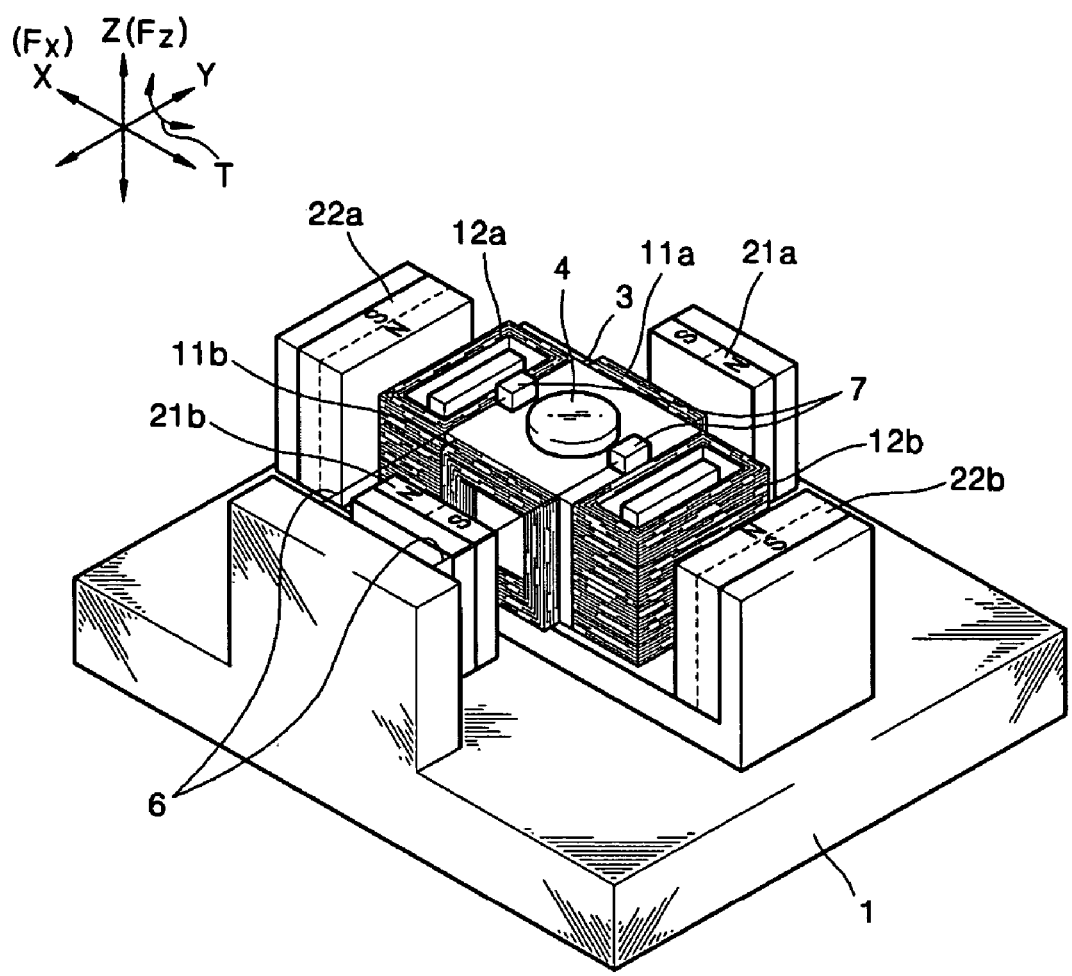
FIG. 1 is a perspective view of a conventional optical pickup actuator.
Figure 2:
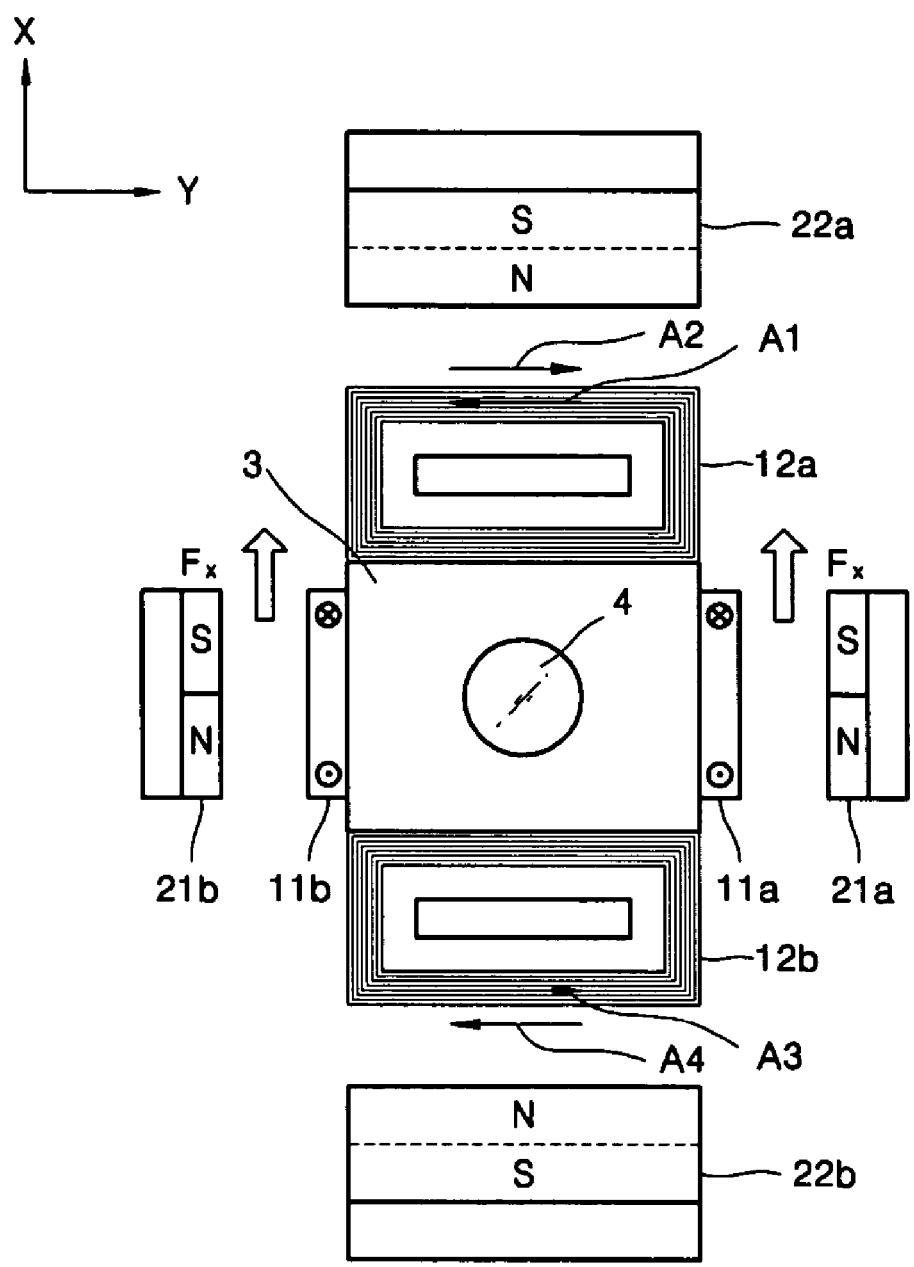
FIG. 2 is a top view of the conventional optical pickup actuator of FIG. 1.

Reference will now be made in detail to the embodiments of the present invention, examples of which are illustrated in the accompanying drawings, wherein like reference numerals refer to the like elements throughout. The embodiments are described below to explain the present invention by referring to the figures.

Figure 3:
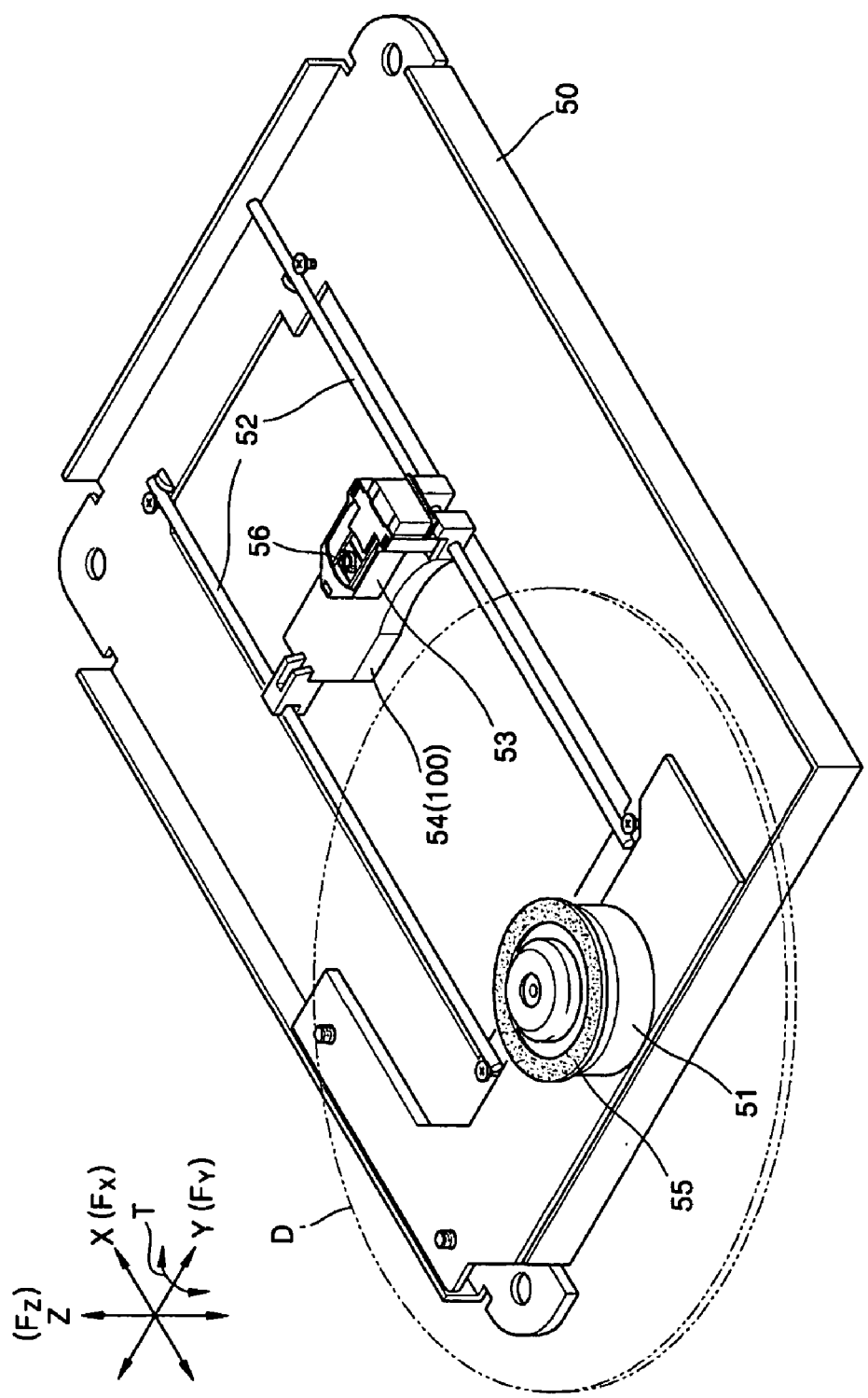
FIG. 3 is a perspective view of a disk drive according to an aspect of the present invention.

Referring to FIG. 3, a base 54 having a spindle motor 51 and an optical pickup 53 mounted thereon is positioned on a mainframe 50. The base 54 is supported on a pair of guide shafts 52 positioned in a radial direction of a disc D on the mainframe 50.

The spindle motor 51 rotates the disc D, and a turntable 55 on which the disc D rests is coupled with a rotary axis of the spindle motor 51. The optical pickup 53 records information on, or reproduces information from, the disc D by emitting light onto the disc D through the objective lens 56. The optical pickup 53 is positioned on the base 54 to reciprocate along the guide shaft 52 in a radial direction of the disc D.

To allow light to be accurately incident on a desired location of the disc D, it is necessary, in some cases, for the objective lens 56 to be driven in two or more directions:, a focusing direction (Z), a tracking direction (X), and in a tilt direction. The optical disk drive includes a device for driving the objective lens 56 (i.e., an optical pickup actuator).

Figure 4:
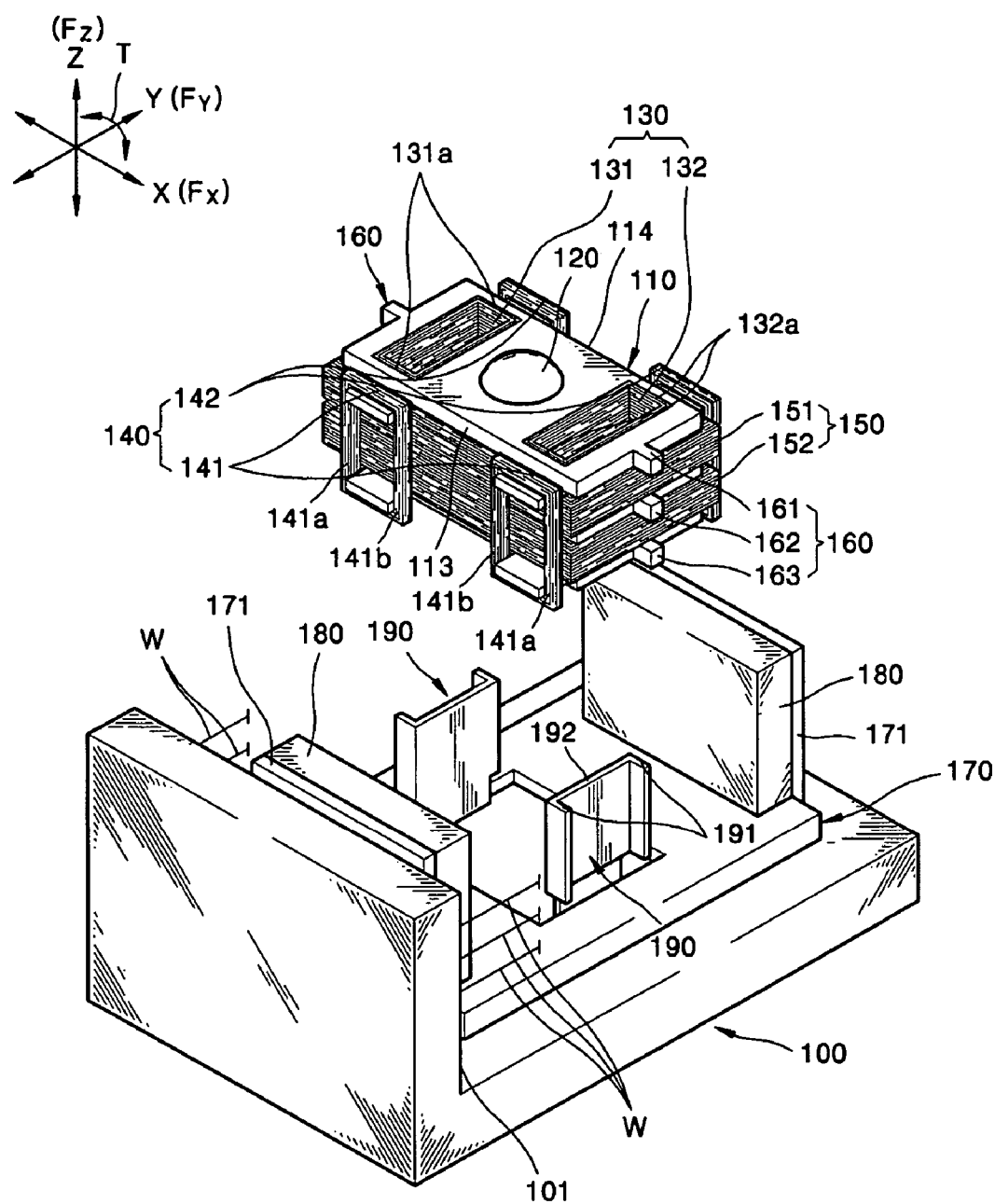
FIG. 4 is an exploded perspective view of an optical pickup actuator according to an aspect of the present invention.
Figure 5:
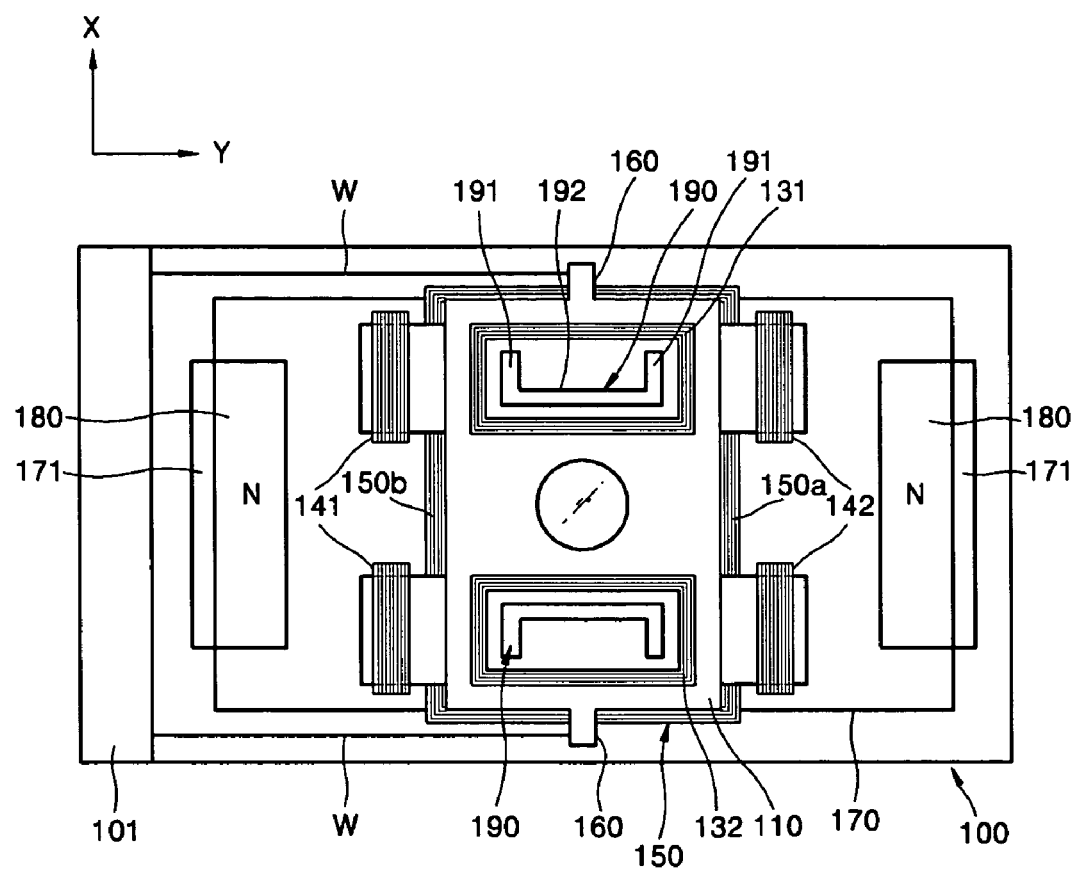
FIG. 5 is a top view of the optical pickup actuator of FIG. 4.

FIG. 4 is an exploded perspective view of an optical pickup actuator according to an aspect of the present invention used in the optical disk drive of FIG. 3. FIG. 5 is a top view of the optical pickup actuator of FIG. 4.

Referring to FIGS. 4 and 5, the optical pickup actuator has a base 100 and a blade 110 holding an objective lens 120. Outer and inner yokes 171 and 190 and a pair of magnets 180 (i.e., a magnetic element retaining magnetism) are positioned on the base 100. According to an aspect of the present invention, the outer and inner yokes 171 and 190 are integrated in a yoke assembly 170. The pair of magnets 180 shown in FIGS. 4 and 5 are disposed opposite to each other in a Y direction (second direction), and are unipolar and magnetized with an N pole. Alternatively, the magnets 180 are unipolar and magnetized with a S pole according to another aspect of the invention. By using only the pair of magnets 180 positioned in the Y direction, a risk of interference with the spindle motor 51 that rotates the disc D is decreased while reducing the number of components of the optical pickup actuator.

First, second and third coils 130, 140, and 150, respectively, are positioned on the blade 110. The first coil 130 is positioned horizontally on the blade 110 and includes a pair of coils 131 and 132 positioned in an X direction (first direction) symmetrically with respect to the objective lens 120. The second coil 140 is disposed on either one or two sides 113 and 114 in the Y direction (second direction) of the blade 110 (i.e., opposite the magnets 180) to generate an electromagnetic force in tracking direction a X due to interaction with the magnets 180. The second coil 140 is positioned vertically on either one or two sides 113 and 114 of the blade 110 and includes coils 141 and 142 positioned on the two sides 113 and 114 symmetrically with respect to the objective lens 120, respectively. According to an aspect of the present invention, coils 141 and/or 142 are formed in pairs, but may be otherwise disposed in other aspects.

The third coil 150 is positioned to surround the outside of the blade 110 horizontally. The third coil 150 is vertically divided into a plurality of coils. As shown in FIG. 4, the third coil 150 is separated into two subcoils: upper and lower coils 151 and 152. One reason for the separation between the coils 151 and 152 of the third coil 150 is to permit flexibility in determining a location of a hinge 160, which will be described later in more detail.

A holder 101 is positioned on the base 100, and a plurality of the hinges 160 are positioned on the blade 110. The blade 110 is positioned to allow the inner yoke 190 to be inserted into the cavity defined by the walls of the first coil 130. Since one end of each of a plurality of suspension wires W is connected to the holder 101 and the other end is connected to the hinge 160, the blade 110 is supported on the base 110 to be elastically movable.

Types of optical pickup actuators include, respectively, (a) focus and tracking coils, (b) focus and tracking coils, of which the focus coil also serves as a tilt coil, or (c) focus, tracking, and tilt coils. The type of optical pickup actuator according to aspects of the invention is dependent on whether the optical pickup actuator includes the third coil 150 and whether the first coil 130 serves as focus and/or tracking coils.

An electromagnetic force acting in the ±Z direction is induced in the first coil 130. An electromagnetic circuit related to the first coil 130 is constructed in different ways depending on the type of the optical pickup actuator. In the case of an (a)-type optical pickup actuator without a third coil 150 and a first coil 130 used as the focus coil, the electromagnetic circuit is constructed so that current is supplied to the coils 131 and 132 in the same direction. In the case of a (b)-type optical pickup actuator without a third coil 150 and a first coil 130 serving as both focus and tilt coils, the electromagnetic circuit is constructed so that current is separately supplied to each of the coils 131 and 132. In the case of the (c)-type optical pickup actuator where the first coil 130 is used only as a tilt coil, the electromagnetic circuit is constructed so that the current is supplied to the coils 131 and 132 in opposite directions. Two sides 131a and 132a placed opposite the magnets 180 are effectively utilized in inducing an electromagnetic force in the coils 131 and 132 of the first coil 130.

Figure 6:
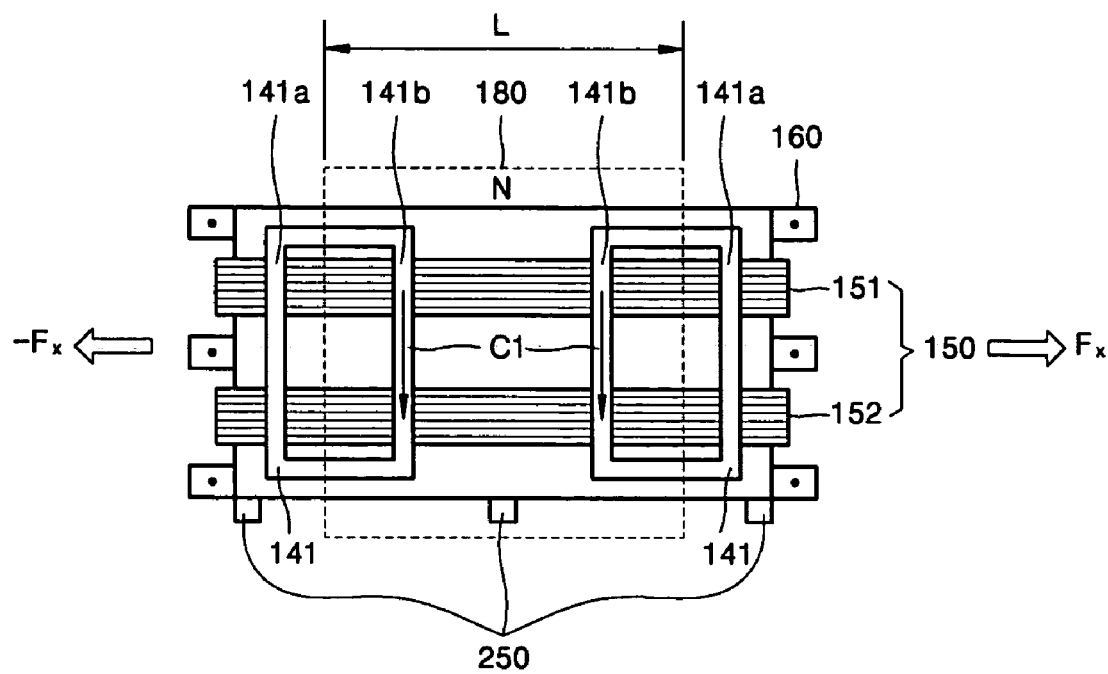
FIG. 6 is a vertical cross-sectional view showing the operation of a second coil according to an aspect of the invention.

Referring to FIG. 6, an inner one 141b of two sides 141a and 141b in the vertical direction of the second coil 140 is effectively used for inducing an electromagnetic force. Thus, a width L of the magnets 180 is determined so as to prevent a magnetic force from acting on the side 141a. When current flows through the second coil 140 in the direction indicated by arrow Cl, an electromagnetic force Fx is induced in the second coil 140. If the direction of the current flowing through the second coil 140 is reversed, then an electromagnetic force −Fx is induced in the second coil 140. Thus, the blade 110 is driven in a tracking direction X by controlling the direction of the current supplied to the second coil 140.

Two sides 150a and 150b (see FIG. 5) of the third coil 150 opposite the magnets 180 are used for actuation in a focusing direction Z. By controlling the direction of current flowing through the third coil 150, an electromagnetic force Fz or −Fz acting in the focusing direction Z is induced in the third coil 150.

The inner yoke 190 is disposed opposite the outer yoke 171 to create a magnetic path. A pair of first walls 191 are disposed to face the second coil 140 and separated from each other in the Y direction (second direction). A second wall 192 extending along the Y direction (second direction) is attached to the pair of first walls 191.

An example of operation of the inner yoke 190 follows. Since only one side 141b of the second coil 140 is used for actuation in the tracking direction X, there is possibility of weakening sensitivity of tracking. Increasing the number of turns in the second coil 140 will improve sensitivity of tracking, but increase the weight of the optical pickup actuator. Thus, to obtain the maximum tracking sensitivity for a given number of turns, it is necessary to concentrate a magnetic field generated by the magnet 180 in the second coil 140. Thus, the inner yoke 190 having a pair of first walls 191 is used to increase an effective area facing the magnet 180 as compared to an inner yoke having only a second wall 192. By including the inner yoke 190 having the first walls 191, it is possible to increase tracking sensitivity. Furthermore, a magnetic path created between the first wall 191 and the outer yoke 171 improves the sensitivity of the first coil 130. Thus, even in the case of the (a)-type optical pickup actuator wherein the first coil 130 is used as a focus coil, it is possible to increase focusing sensitivity. For the (b)-type optical pickup actuator in which the first coil 130 functions as both focus and tilt coils, it is possible to improve focusing and tilt sensitivities. In the (c)-type optical pickup actuator where the first coil 130 serves as a tilt coil, tilt sensitivity is be improved.

Tables 1 and 2 show magnitudes of electromagnetic forces induced in first, second, and third coils, respectively, 130, 140, and 150, which are measured for the (c)-type optical pickup actuator. Case 1 shows magnitudes for an actuator including an inner yoke 190 having only the second wall 192. Case 2 shows magnitudes for an actuator including an inner yoke 190 having both first and second walls 191 and 192, respectively. Current supplied to the respective coils 130, 140, and 150 is 150 mA, and Fx, Fy, and Fz are measured in units of Newton/Volt (N/V).

TABLE 1

| | Electromagnetic force | | |
|---|---|---|---|
| CASE 1 | Fx | Fy | Fz |
| First coil (tilt coil) | 0.00325 | −0.00003 | 0.03387 |
| Second coil (tracking coil) | 0.03594 | 0.00012 | −0.00003 |
| Third coil (focus coil) | −0.00006 | 0.00009 | 0.07178 |

TABLE 2

| | Electromagnetic force | | |
|---|---|---|---|
| CASE 2 | Fx | Fy | Fz |
| First coil (tilt coil) | 0.00358 | −0.00015 | 0.04478 |
| Second coil (tracking coil) | 0.05677 | 0.00004 | −0.00006 |
| Third coil (focus coil) | −0.00004 | 0.00003 | 0.07170 |

As evident from Tables 1 and 2, while CASE 1 and CASE 2 exhibit almost equal electromagnetic forces Fz in a focusing direction Z induced in the third coil 150, CASE 2 shows that electromagnetic forces Fy and Fx in tilt and tracking directions T and X induced in the first and second coils 130 and 140, respectively, are greater (i.e., by about 32% and 58% greater) than respective forces in CASE 1. In other words, including an inner yoke 190 having the first walls 191 makes it possible to significantly improve sensitivities in tracking and tilt directions X and T. The result of this experiment also apply to the (a)-type and (b)-type of optical pickup actuators.

Next, an example of operation of an optical pickup actuator including a third coil 150 follows:

The blade 110 is supported on the base 100 by the plurality of suspension wires W to be elastically movable. For the blade 110 to be driven in the desired direction by an electromagnetic force generated due to interaction between the magnets 180 and each of the first, second, and third coils, respectively, 130, 140, and 150, the location of each of the plurality of hinges 160 being connected to one end of each suspension wire W is important. For example, improper selection of the location of the hinge 160 causes the blade 110 to roll, yaw, or pitch, which prohibits it from being precisely driven.

A factor in determining the position of the hinges 160 includes considering the location of the center of gravity of the blade 110 after all other components including the objective lens 120 and the first, second, and third coils 130, 140, and 150, respectively, have been mounted. With the recent decrease in the size and weight of an optical recording apparatus and increase in demand for higher recording densities, the size and weight of the blade 110 is decreasing while the level of precision required for optical pickup actuators continues to increase. Thus, this further decreases the space available for the hinges 160. For the optical pickup actuator to further perform actuation in a tilt direction, at least six suspension wires W are required, which further reduces flexibility in determining the position of the hinges 160.

According to an aspect of the present invention, to address this problem, the third coil 150 is vertically divided into two subcoils. As an example of the location of the hinges 160 to be positioned, three hinges 161 through 163 are positioned on either side of the blade 110 in the X direction (first direction), as shown, for example, in FIG. 4. In this case, two of the three hinges i.e., 161 and 163 are positioned at the top and bottom of the third coil 150, respectively. The remaining hinge 162 is positioned between the two subcoils 151 and 152. Depending on the position of the hinge 160 and considering the center of gravity of the blade 110, an improved determination of a division of the third coil 150 is possible. For example, the number of subcoils and location of division of the third coil 150 are determined. Although an aspect of the present invention has been described with reference to the example in which the third coil 150 is vertically divided into two subcoils, the present invention is not so limited. According to an aspect of the invention, depending on the related conditions, the third coil 150 is vertically divided into three or more subcoils. By dividing the third coil 150 into a plurality of subcoils, it is possible to position the hinges 160 in such a manner that the blade 110 is optimally supported on the base 100. It is also possible to minimize a change in a number of turns in the third coil 150, and thus maintain the excellent focusing sensitivity.

Figure 8:
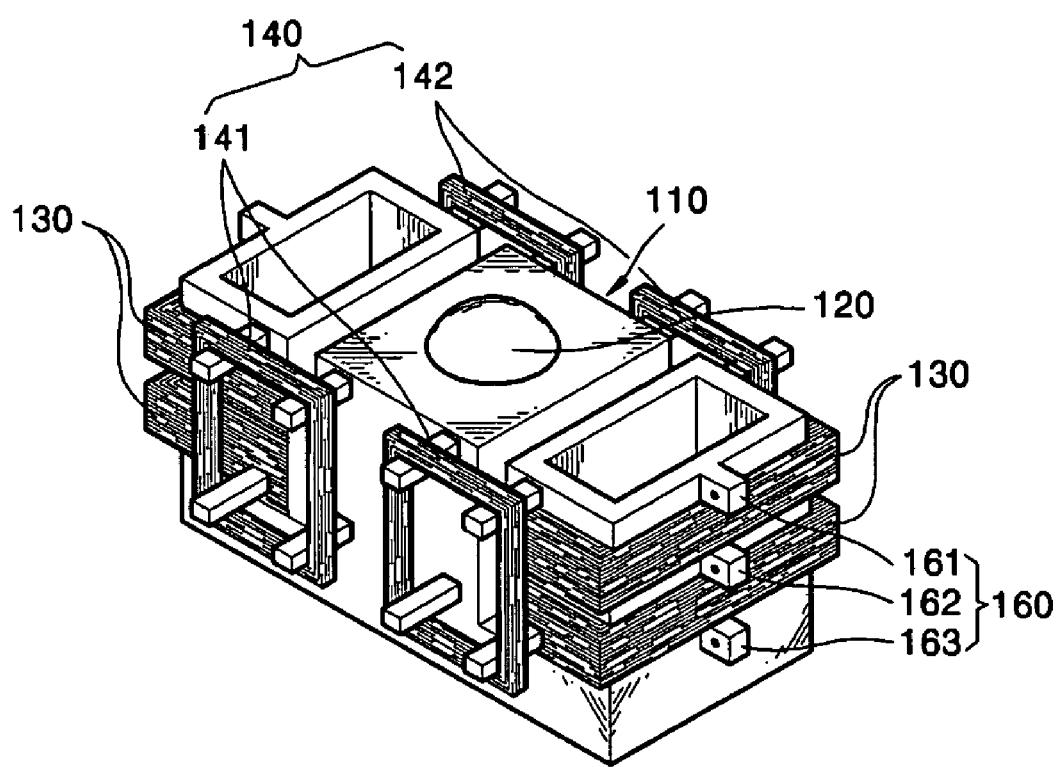
FIG. 8 is a perspective view of an optical pickup actuator according to another aspect of this invention.

As described above, the third coil 150 acting as a focus coil is divided into a plurality of subcoils in a (c)-type optical pickup actuator including the first through third coils, 130, 140, and 150, respectively. However, the present invention is not limited to the illustrative example. For example, as shown in FIG. 8, a first coil 130 in (a)-type and (b)-type optical pickup actuators is exposed to two sides of a blade 110. In this case, the first coil 130 is vertically divided into a plurality of subcoils to facilitate installation of the hinges 160.

Additionally, when the blade 110 is driven in the focusing direction Z, it is necessary to restrict the driving distance because an excessive driving distance causes the blade 110 to collide with the base 100 or yoke assembly 170. This collision results in damage to various optical components including lenses (not shown) mounted on the base 100, as well as the objective lens 120.

Figure 7:
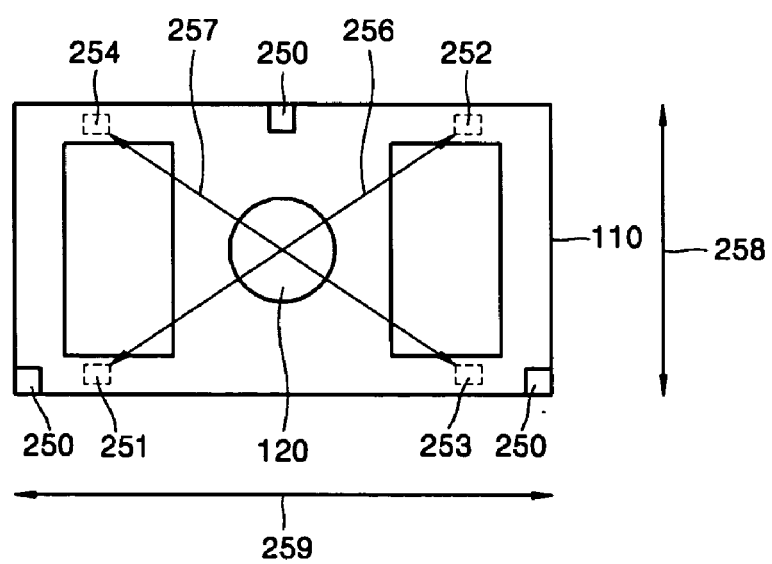
FIG. 7 is a schematic rear view of the blade shown in FIG. 4.

As shown as by broken-line boxes in FIG. 7, an optical pickup actuator may include stoppers 251 and 252, or 253 and 254. Although it is desirable for the blade 110 to descend precisely in a focusing direction Z, the blade 110 may be tilted toward directions marked by diagonal lines 256 and 257 or directions 258 and 259 due to many factors while descending. An optical pickup actuator having the stoppers 251 and 252 cannot prevent the blade 110 from colliding with the base 100 or the yoke assembly 170 when the blade 110 is tilted toward the direction marked by the diagonal line 257. Likewise, an optical pickup actuator having the stoppers 253 and 254 cannot prevent the blade 110 from colliding with the base 100 or the yoke assembly 170 when the blade 110 is tilted toward the direction marked by the diagonal line 256. To solve these problems, all the stoppers 251 through 254 may be used. However, since it is not possible for the blade 110 to be simultaneously tilted toward the directions 256 and 257, using all the stoppers 251 through 254 imposes an excessive constraint on the optical pickup actuator.

As shown in FIG. 7, the blade 110 according to an aspect of the present invention has three stoppers 250 centered on the objective lens 120. This configuration prevents the blade 110 from being tilted toward any of the directions 256 through 259 while descending. The stoppers 250 may be positioned on the base 100 or yoke assembly 170.

As described in the foregoing, the optical pickup actuator according to aspects of the present invention has numerous advantages. For example, an aspect of the present invention improves flexibility in the installation of hinges coupled to suspension wires, respectively, on the blade by dividing a coil into a plurality of subcoils. Thus, it is possible to stably support the blade on the base. In addition, an aspect of the present invention has an inner yoke increases an effective area facing the magnet, thereby improving sensitivity in actuation of the blade. Also, by using only a pair of unipolar magnets, the size and weight of the optical pickup actuator is decreased while decreasing the risk of interference with the spindle motor. In addition, an aspect of-the present invention has three stoppers that stably reduce excessive actuation of the blade in a focusing direction.

Although a few embodiments of the present invention have been shown and described, it would be appreciated by those skilled in the art that changes may be made in this embodiment without departing from the principles and spirit of the invention, the scope of which is defined in the claims and their equivalents.

What is claimed is:

1. An optical pickup actuator for use with an objective lens on a base, comprising:
    a blade holding the objective lens;
    a plurality of suspension wires supporting the blade on the base so that the blade is elastically movable;
    a magnetic element positioned on the base; and
    a coil positioned horizontally on the blade to generate an electromagnetic force in a focusing and/or tilting direction through an interaction with the magnetic element,
    wherein the coil is divided into a plurality of subcoils, where each subcoil is separated from an adjacent subcoil in a vertical direction, and
    wherein the coil comprises a pair of first coils positioned on the blade in a first direction and facing each other with respect to the objective lens.

2. The optical pickup actuator according to claim 1, wherein the coil comprises a coil surrounding an outer surface of the blade.

3. The optical pickup actuator according to claim 1, further comprising a second coil positioned vertically on a side of the blade in a second direction substantially perpendicular to the first direction, the second coil generating an electromagnetic force in a tracking direction through interaction with the magnetic element.

4. The optical pickup actuator according to claim 3, wherein the second coil is positioned on both sides of the blade.

5. The optical pickup actuator according to claim 3, further comprising an inner yoke positioned on the base and positioned within a cavity defined by walls of the first coil,
wherein the inner yoke has a pair of first walls disposed opposite the second coil and separated from each other in the second direction.

6. The optical pickup actuator according claim 4, further comprising an inner yoke positioned on the base and positioned within a cavity defined by walls of the first coil,
wherein the inner yoke has a pair of first walls disposed opposite the second coil and separated from each other in the second direction.

7. The optical pickup actuator according to claim 1, wherein the magnetic element comprises a pair of unipolar magnets disposed opposite each other with respect to the blade and have the same polarity.

8. The optical pickup actuator according to claim 3, wherein the magnetic element comprises a pair of unipolar magnets disposed opposite each other with respect to the blade in the second direction and have the same polarity.

9. The optical pickup actuator according to claim 1, further comprising three stoppers interposed between the blade and the base for preventing the blade from colliding with the base when excessively driven toward the base and arranged in a triangular shape centered on the objective lens.

10. An optical disc drive for a disc that is a recording medium, comprising:
a spindle motor for rotating the disc;
an optical pickup for recording and/or reproducing information by emitting light onto the disc through an objective lens; and
an optical pickup actuator for controlling a position of the objective lens so that the emitted light is focused on a desired position of the disc, the optical pickup actuator comprising:
a blade holding the objective lens,
a plurality of suspension wires supporting the blade on a base so that the blade is elastically movable,
a magnetic element positioned on the base, and
a coil positioned horizontally on the blade to generate an electromagnetic force in a focusing direction and/or a tilting direction through interaction with the magnetic element,
wherein the coil is divided into a plurality of subcoils, where each subcoil is separated from an adjacent subcoil in a vertical direction, and
wherein the coil comprises a pair of first coils positioned on the blade in a first direction so as to face each other with respect to the objective lens.

11. The optical disc drive according to claim 10, wherein the coil comprises a coil positioned on the blade so as to surround an outer surface of the blade.

12. The optical disc drive according to claim 10, wherein the optical pickup actuator further comprises a second coil positioned vertically on a side of the blade in a second direction substantially perpendicular to the first direction, the second coil generating an electromagnetic force in a tracking direction through interaction with the magnetic element.

13. The optical disc drive according to claim 12, wherein the second coil is positioned on both sides of the blade.

14. The optical disc drive according to claim 12, wherein the optical pickup actuator further comprises an inner yoke positioned on the base and placed inside the first coil, and
wherein the inner yoke has a pair of first walls disposed opposite the second coil and separated from each other in the second direction.

15. The optical disc drive according to claim 12, wherein the magnetic element comprises a pair of unipolar magnets disposed opposite each other with respect to the blade in the second direction and have the same polarity.

16. The optical disc drive according to claim 10, wherein the optical pickup actuator further comprises three stoppers interposed between the blade and the base for preventing the blade from colliding with the base when excessively driven toward the base and arranged in a triangular shape centered on the objective lens.

17. An optical pickup actuator for use with an objective lens on a base, comprising:
a blade holding the objective lens;
a plurality of suspension wires supporting the blade on the base so that the blade is elastically movable;
a pair of first coils positioned horizontally on the blade and disposed opposite each other with respect to the objective lens in a first direction;
a second coil positioned vertically on a side of the blade in a second direction perpendicular to the first direction; and
an inner yoke positioned on the base, the inner yoke positioned inside a cavity defined by each of the first coils,
wherein the inner yoke has a pair of first walls disposed opposite the second coil and separated from each other in the second direction.

18. The optical pickup actuator according to claim 17, wherein each of the first coils is divided into a plurality of subcoils, where each subcoil is separated from an adjacent subcoil in a vertical direction.

19. The optical pickup actuator according to claim 17, further comprising a third coil positioned so as to surround the sides of the blade.

20. The optical pickup actuator according to claim 19, wherein the third coil is divided into a plurality of subcoils that are vertically separated from one another.

21. The optical pickup actuator according to claim 17, further comprising a pair of unipolar magnets disposed opposite each to other with respect to the blade in the second direction and have the same polarity.

22. The optical pickup actuator according to claim 17, further comprising three stoppers interposed between the blade and the base for preventing the blade from colliding with the base when excessively driven toward the base and arranged in a triangular shape centered on the objective lens.

23. The optical pickup actuator according to claim 17, wherein the second coil is positioned vertically on both sides of the blade in the second.

24. An optical disc drive for a disc that is a recording medium, comprising:
a spindle motor for rotating the disc;
an optical pickup for recording and/or reproducing information by emitting light focuses onto the disc through an objective lens; and
an optical pickup actuator for controlling a position of the objective lens so that the emitted light is focused on a desired position of the disc, the optical pickup actuator comprising:
a blade holding the objective lens and supported on a base by a plurality of suspension wires so that the blade is elastically movable,
a pair of first coils positioned horizontally on the blade and disposed opposite each other with respect to the objective lens in a first direction, a second coil positioned vertically on a side of the blade in a second direction perpendicular to the first direction, and an inner yoke positioned on the base, the inner yoke positioned inside a cavity formed by walls of each of the first coils, wherein the inner yoke has a pair of first walls disposed opposite the second coil and separated from each other in the second direction.

25. The optical disc drive according to claim 24, wherein each of the first coils is divided into a plurality of subcoils, where each subcoil is separated from an adjacent subcoil in the vertical direction.

26. The optical disc drive according to claim 24, wherein the optical pickup actuator further comprises a third coil positioned to surround the sides of the blade.

27. The optical disc drive according to claim 26, wherein the third coil is divided into a plurality of subcoils, where each subcoil is separated from an adjacent subcoil in the vertical direction.

28. The optical disc drive according to claim 24, wherein the optical pickup actuator further comprises a pair of unipolar magnets disposed opposite to each other with respect to the blade in the second direction and have the same polarity.

29. The optical disc drive according to claim 24, wherein the optical pickup actuator further comprises three stoppers interposed between the blade and the base for preventing the blade from colliding with the base when excessively driven toward the base and arranged in a triangular shape centered on the objective lens.

30. An optical pickup actuator for use with an objective lens on a base, comprising:
a blade holding the objective lens;
a plurality of suspension wires supporting the blade on the base so that the blade is elastically movable; and
three stoppers interposed between the blade and the base for preventing the blade from colliding with the base when excessively driven toward the base and arranged in a triangular shape centered on the objective lens.

31. The optical pickup actuator according to claim 30, wherein the stoppers are positioned on the blade.

32. The optical pickup actuator according to claim 30, wherein the stoppers are positioned on the base.

33. An optical disc drive for a disc that is a recording medium, comprising:
a spindle motor for rotating the disc;
an optical pickup for recording and/or reproducing information by emitting light focused onto the disc through an objective lens; and
an optical pickup actuator for controlling a position of the objective lens so that the emitted light is focused on a desired position of the disc, the optical pickup actuator comprising:
a blade holding the objective lens;
a plurality of suspension wires supporting the blade on the base so that the blade is elastically movable; and
three stoppers interposed between the blade and the base for preventing the blade from colliding with the base when excessively driven toward the base and arranged in a triangular shape centered on the objective lens.

34. The optical disc drive according to claim 33, wherein the stoppers are positioned on the blade.

35. The optical disc drive according to claim 33, wherein the stoppers are positioned on the base.

36. An optical pickup actuator for use with an objective lens on a base, comprising:
a blade holding the objective lens;
a plurality of suspension wires movingly supporting the blade on the base;
a pair of unipolar magnets positioned on the base; and
a plurality of coils positioned on the blade and interacting with the unipolar magnets to create an electromagnet force to move the blade; and
an inner yoke positioned inside a cavity defined by the walls of a coil, wherein the yoke comprises three sections with each of the three sections of the yoke being parallel to a different wall of the cavity to increase an effective area facing the magnets.

37. The optical pickup actuator according to claim 36, wherein one of the coils is divided into a plurality of subcoils that are separated from one another.

38. The optical pickup actuator according to claim 36, wherein one of the coils is positioned to surround the sides of the blade.

39. The optical pickup actuator according to claim 36, wherein the base has only a single pair of unipolar magnets.

40. An optical pickup actuator for use with an objective lens on a base, comprising:
a blade holding the objective lens;
a plurality of suspension wires movingly supporting the blade on the base;
a plurality of hinges each of coupled to an end of a suspension wire;
a pair of unipolar magnets positioned on the base; and
a plurality of coils connected to an electric circuit and interacting with the unipolar magnets to create an electromagnet force to move the blade; and
wherein at least one of the plurality of coils is divided into subcoils and a hinge coupled to each of the plurality of suspension wires is between an adjacent pair of subcoils.

41. The optical pickup actuator according to claim 40, wherein the plurality of suspension wires are at least six suspension wires and the coil is divided into three or more subcoils.

42. The optical pickup actuator according to claim 40, wherein a first hinge and a second hinge are positioned on each of a top and a bottom of one of the coils, respectively, and a third hinge is positioned between two of the subcoils.

43. The optical pickup actuator according to claim 40, wherein the coils are focus and tracking coils and the electric circuit supplies current to the coils in the same direction.

44. The optical pickup actuator according to claim 40, wherein the coils are focus and tracking coils, of which the focus coil also serves as a tilt coil and the electric circuit supplies current separately to each of the coils.

45. The optical pickup actuator according to claim 40, wherein the coils are focus, tracking, and tilt coils and the circuit supplies current to the coils in opposite directions.

* * * * *

UNITED STATES PATENT AND TRADEMARK OFFICE
CERTIFICATE OF CORRECTION

PATENT NO. : 7,266,055 B2 Page 1 of 1
APPLICATION NO. : 10/849190
DATED : September 4, 2007
INVENTOR(S) : Won-ik Cho et al.

It is certified that error appears in the above-identified patent and that said Letters Patent is hereby corrected as shown below:

Column 12, Line 41, in Claim 21, after "each" delete "to".

Signed and Sealed this

Eleventh Day of March, 2008

JON W. DUDAS
*Director of the United States Patent and Trademark Office*